(12) United States Patent
Kobayashi et al.

(10) Patent No.: US 6,508,964 B2
(45) Date of Patent: *Jan. 21, 2003

(54) METHOD OF MANUFACTURING CERAMIC SINTERED BODIES

(75) Inventors: Hiromichi Kobayashi, Yokkaichi (JP); Satoru Yamada, Owariasahi (JP); Tetsuhisa Abe, Kuwana (JP)

(73) Assignee: NGK Insulators, Ltd, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/945,766

(22) Filed: Sep. 4, 2001

(65) Prior Publication Data

US 2002/0003318 A1 Jan. 10, 2002

Related U.S. Application Data

(63) Continuation of application No. 09/434,701, filed on Nov. 5, 1999, now Pat. No. 6,306,325.

(30) Foreign Application Priority Data

Nov. 13, 1998 (JP) ............................................. 10-323264

(51) Int. Cl.[7] ................................................. C04B 35/74
(52) U.S. Cl. .................. 264/113; 264/125; 264/272.12; 264/325; 264/332; 264/618
(58) Field of Search ................... 264/325, 332, 264/618, 113, 125, 272.12

(56) References Cited

U.S. PATENT DOCUMENTS

| | | | |
|---|---|---|---|
| 2,990,602 A | 7/1961 | Brandmayr et al. | |
| 4,126,653 A | * 11/1978 | Smith et al. | .................. 264/125 |
| 4,153,666 A | 5/1979 | Alliegro | |
| 4,640,809 A | 2/1987 | Yokoi et al. | |
| 6,013,898 A | * 1/2000 | Mizuno | ....................... 219/270 |
| 6,143,238 A | 11/2000 | Konishi et al. | |
| 6,306,325 B1 | * 10/2001 | Kobayashi et al. | .......... 264/113 |

FOREIGN PATENT DOCUMENTS

JP  5-251365  9/1993

* cited by examiner

*Primary Examiner*—James Derrington
(74) *Attorney, Agent, or Firm*—Burr & Brown

(57) ABSTRACT

Ceramic sintered bodies having a different thickness along a predetermined axial direction are manufactured in the following manner. At first, a ceramic formed body to be sintered having different thickness along the predetermined axial direction is accommodated in a hot press apparatus. An upper forming mold and a lower forming mold each having a forming surface corresponding to an upper surface and a lower surface of the ceramic formed body to be sintered are set. A pressure along the predetermined axial direction is applied to the ceramic formed body to be sintered via the upper forming mold and the lower forming mold while heating the ceramic formed body to be sintered to perform a hot press sintering thereof. A thickness of a ceramic sintered body is controlled in such a manner that a maximum thickness in the predetermined direction is not more than two times a minimum thickness in the predetermined direction.

6 Claims, 5 Drawing Sheets

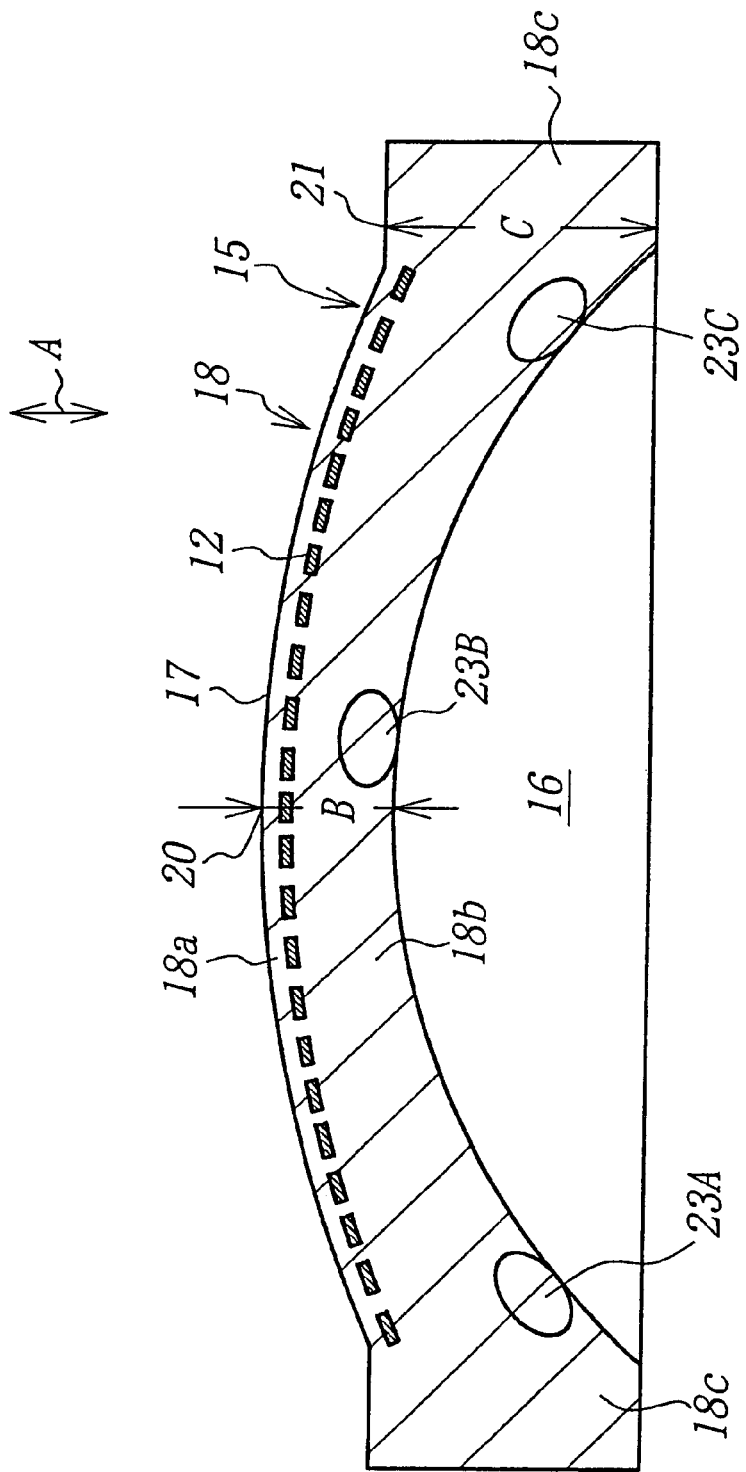

METHOD OF MANUFACTURING CERAMIC SINTERED BODIES

CROSS REFERENCE TO RELATED APPLICATION

This is a continuation application of U.S. Ser. No. 09/434,701, filed Nov. 5, 1999, now U.S. Pat. No. 6,306,325, the entirety of which is incorporated herein by reference.

BACKGROUND OF THE INVENTION

1. Field of the Invention

The present invention relates to a method of manufacturing ceramic sintered bodies by means of a hot press method.

2. Description of Related Art

A pressurized sintering method of ceramics by means of a hot press method is generally used for sintering various kinds of ceramics such as silicon nitride, silicon carbide and aluminum nitride. Such a sintering method is applied for manufacture of electric materials such as ferrite for a magnetic head, ferroelectric piezoelectric ceramics, transparent ceramics and transparent piezoelectric ceramics.

The applicant disclosed, in Japanese Patent Laid-Open Publication No. 5-251365 (JP-A-5-251365), a hot pressing of aluminum nitride ceramics to manufacture a substrate for a semiconductor manufacturing apparatus such as a ceramics heater, a ceramics electrostatic chuck, a ceramics high frequency electrode apparatus and a ceramics susceptor. In the method mentioned above, when a formed body made of aluminum nitride powders is accommodated in a hot press apparatus, a graphite foil is arranged between the formed body and a sleeve and between the formed body and a spacer, in order to control the environmental atmosphere of the formed body and also to prevent a reaction between the formed body and the sleeve or the spacer.

In the semiconductor manufacturing apparatus, it is known that a sintered body having a dome shape is used as an electrode for plasma generation by embedding a metal member in the sintered body having a dome shape and conducting electricity through the metal member.

However, in the known hot press method, it is thought to be difficult to obtain a sintered body having an irregular shape other than a planar shape because the shrinkage of the formed body along the pressure applying axial direction is extremely large. On the other hand, the thickness of a ceramic sintered body having an irregular shape is largely varied corresponding to a position on a surface of the ceramic sintered body along a pressure applying axial direction. Therefore, it is thought that pressure is not uniformly applied to various portions of the formed body and the portions are then not uniformly heated.

Therefore, in order to manufacture a sintered body having, for example, a dome shape, a sintered body having a large plane shape is first manufactured by means of the hot press method, and then the thus manufactured sintered body is ground. However, such a grinding step involves a large amount of time. In addition, when a metal member, such as an electrode, is embedded in the sintered body having a plane shape, it is extremely difficult to correctly measure the portion in the sintered body at which the metal member is embedded and grind the sintered body corresponding to the portion of the metal member. Therefore, the drawback is that the embedded position of the metal member is liable to be shifted from a designed normal position.

SUMMARY OF THE INVENTION

An object of the present invention is to provide a method of manufacturing ceramic sintered bodies in which a ceramic sintered body having a different thickness along a predetermined axial direction can be obtained.

According to the invention, a method of manufacturing ceramic sintered bodies having a different thickness along a predetermined axial direction, comprises the steps of accommodating a ceramic formed body to be sintered having a different thickness along the predetermined axial direction in a hot press apparatus; setting an upper forming mold and a lower forming mold each having a forming surface corresponding to an upper surface and a lower surface of the ceramic formed body to be sintered, applying a pressure along the predetermined axial direction to the ceramic formed body to be sintered via the upper forming mold and the lower forming mold while heating the ceramic formed body to be sintered to perform a hot press sintering thereof; and controlling a thickness of a ceramic sintered body in such a manner that a maximum thickness in the predetermined direction is not more than two times a minimum thickness in the predetermined direction.

The inventors found that it was possible to sinter the ceramic formed body without generating unevenness of, for example, density at various portions of the sintered body through the use of an upper forming mold and a lower forming mold each having a forming surface corresponding to an upper surface and a lower surface of the ceramic formed body to be sintered. A thickness of the ceramic sintered body is controlled in such a manner that a maximum thickness in the predetermined direction is nor more than two times a minimum thickness in the predetermined direction. Moreover, in the preferred embodiment, the thickness of the ceramic sintered body is continuously varied from the maximum thickness to the minimum thickness.

Here, the use of an upper forming mold and a lower forming mold is a known forming method for axially pressurized forming. However, in the present invention, the upper forming mold and the lower forming mold, each having a forming surface corresponding to an upper surface and a lower surface of the ceramic formed body to be sintered, are used for performing the hot press sintering with respect to the formed body having an irregular shape. In this manner, the properties of the sintered body after hot pressing can be controlled.

In another preferred embodiment, the hot press sintering for the ceramic formed body is performed after the metal member is embedded in the ceramic formed body to be sintered. In this case, the position of the metal member in the sintered body after the hot press sintering can be approximately determined by the position of the metal member just before the hot press sintering. Therefore, it is possible to reduce the positional shift of the metal member in the sintered body as compared with the sintered body obtained according to the known method. Moreover, in this case, it is possible to deform the metal member by embedding the metal member having a planar shape in the formed body and by applying pressure to the metal member via the upper and lower forming molds and further via the ceramic powders in the formed body when the hot press sintering is performed.

In still another preferred embodiment, the metal member is preliminarily formed corresponding to the forming surface of the upper forming mold or the lower forming mold, and the thus formed metal member is embedded in the ceramic formed body to be sintered. In that case, ceramic powders in the ceramic formed body near the metal member after the deformation are moved when the hot press sintering is performed. However, here, since the three-dimensional shape of the metal member corresponds to the forming surface of one of the upper forming mold and the lower forming mold, it is possible to prevent a positional shift of the metal member along the pressurized axial direction, and to further improve the positional precision of the metal member in the sintered body after the hot press sintering.

In still another preferred embodiment, a ceramic sintered body having a dome shape including a projected upper surface and a concaved lower surface, the thickness of which is controlled in such a manner that a maximum thickness in the predetermined direction is not more than Two times a minimum thickness in the predetermined direction, is manufactured by setting a sintering support tool having a cylinder, an upper transcribing forming mold and a lower transcribing forming mold in the hot press apparatus; supplying ceramic raw materials between the upper transcribing forming mold and the lower Transcribing forming mold in the cylinder of the sintering support tool; performing one directional pressing for the ceramic raw materials by means of the upper transcribing forming mold and the lower transcribing forming mold to obtain a first formed body; setting an electrode member on the first formed body; supplying the ceramic raw materials on the first formed body, on which the electrode member is set, in the cylinder of the sintering support tool; and applying a pressure along an axial direction of the sintering support tool to the first formed body, on which the electrode member is set, while heating the first formed body to perform a hot press sintering thereof. In this case, it is possible to manufacture a ceramic sintered body having a dome shape.

In the present invention, as the ceramic formed body to be sintered by means of the hot press sintering, use is made of ceramic powders, formed body of the ceramic powders, cleaned body of the formed body and calcined body of the formed body. Moreover, as a material of the metal member, use is made of a metal or an alloy which is not melted when the hot press sintering is performed.

BRIEF DESCRIPTION OF THE DRAWINGS

FIG. 5 is a schematic cross sectional view illustrating an electrode apparatus.

DETAILED DESCRIPTION OF THE INVENTION

FIGS. 1–4 are schematic cross sectional views respectively showing the state of a hot press apparatus in each step according to the invention, and FIG. 5 is a schematic cross sectional view illustrating an electrode apparatus 15 having a dome shape for a plasma generation.

Figure 1:
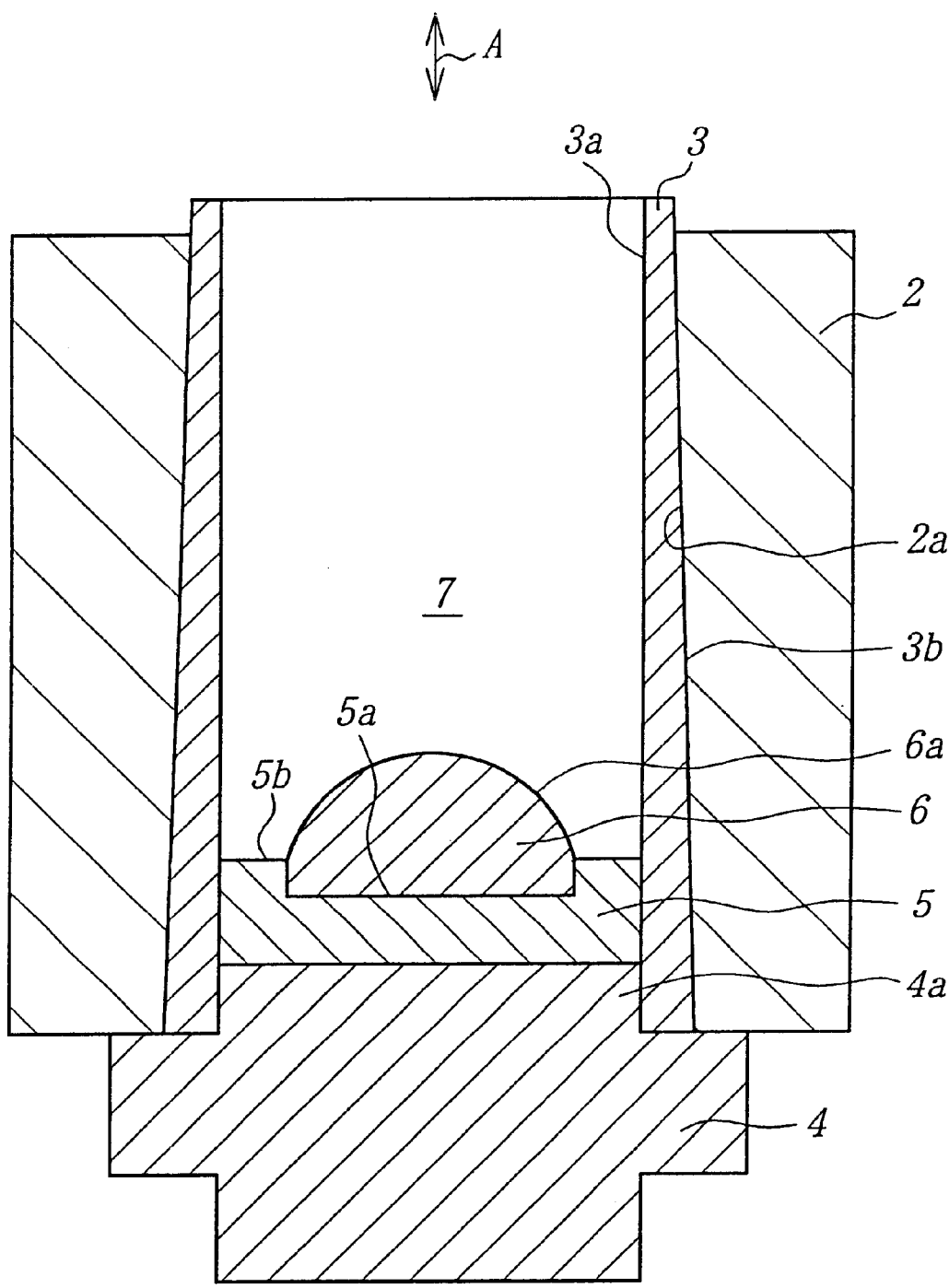
FIG. 1 is a schematic cross sectional view showing a lower punch and lower forming molds according to the invention.

In the embodiment shown in FIG. 1, a sleeve 3 having an approximately cylindrical shape is accommodated in a mold 2 in such a manner that an outer surface 3b of the sleeve 3 is contacted to an inner surface 2a of the mold 2. The sleeve 3 can be divided into more than two pieces. The outer surface 3b of the sleeve 3 is slightly inclined with respect to a predetermined axis A. A receiving mount 4a of a lower punch 4 is inserted in a lower portion of the inner surface 3a of the sleeve 3. Lower forming molds 5 and 6 are arranged on the receiving mount 4a. A concaved portion 5a is formed in an upper surface 5b (forming surface) of the lower forming mold 5, and the lower forming mold 6 is inserted and fixed in the concaved portion 5a. An upper surface 6a (forming surface) of the lower forming mold 6 has an arch shape. A space 7 used for hot pressing is formed on the lower forming molds 5 and 6.

Figure 2:
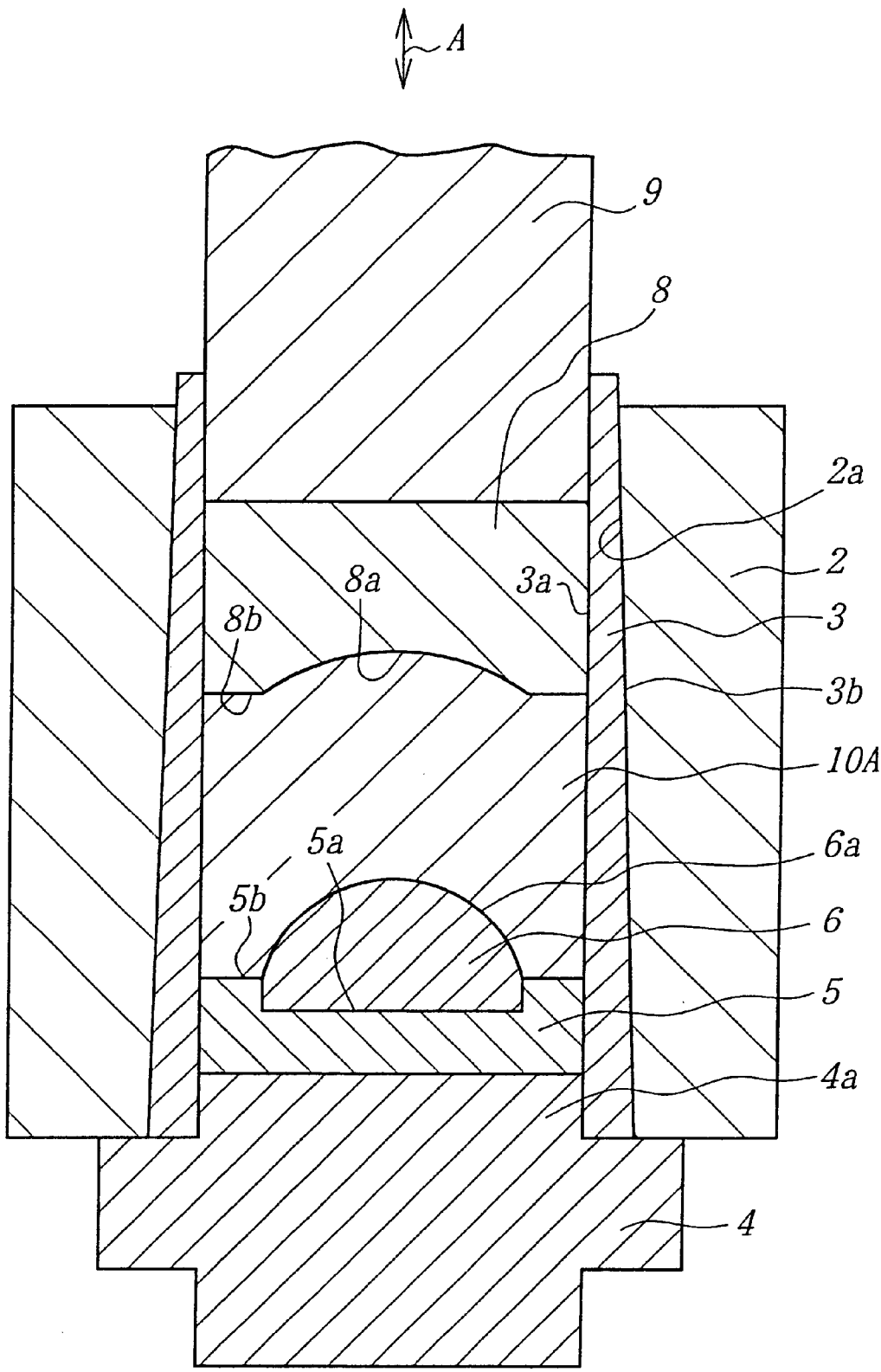
FIG. 2 is a schematic cross sectional view illustrating a state in which ceramic powders are supplied on the lower forming molds.

As shown in FIG. 2, ceramic powders 10A are accommodated in the space 7. An upper forming mold 8 and an upper punch 9 are arranged on the ceramic powders 10A. A concaved portion 8a is arranged in a lower surface 8b of the upper forming mold 8. In this case, a surface of the concaved portion 8a and the lower surface 8b construct a forming surface of the upper forming mold 8. Under such a condition, the ceramic powders 10A are pressed by applying a pressure thereto in the axial direction so as to obtain a first formed body 11A shown in FIG. 3.

Figure 3:
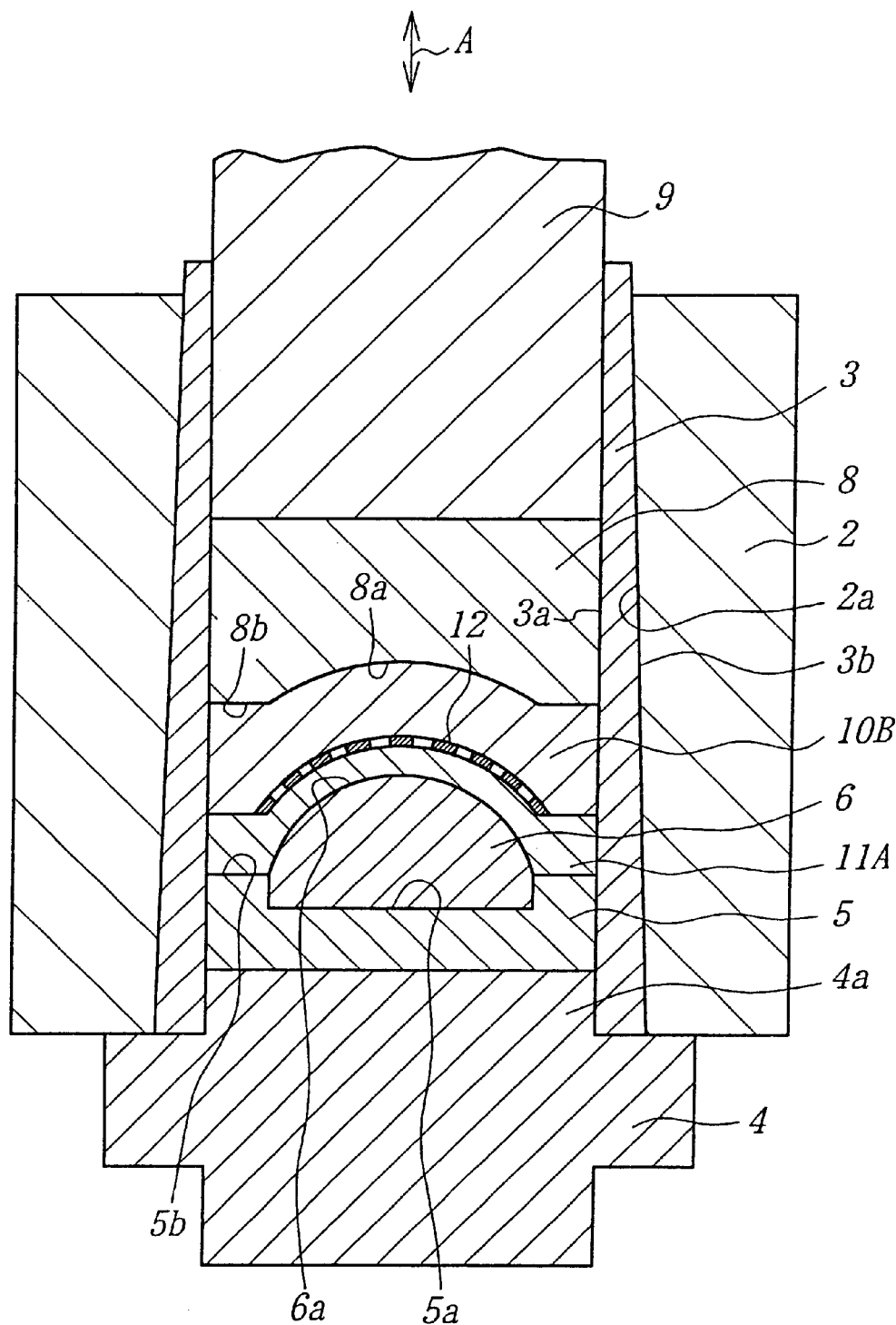
FIG. 3 is a schematic cross sectional view depicting a state in which an electrode is arranged on a first formed body and ceramic powders are supplied thereon.
Figure 4:
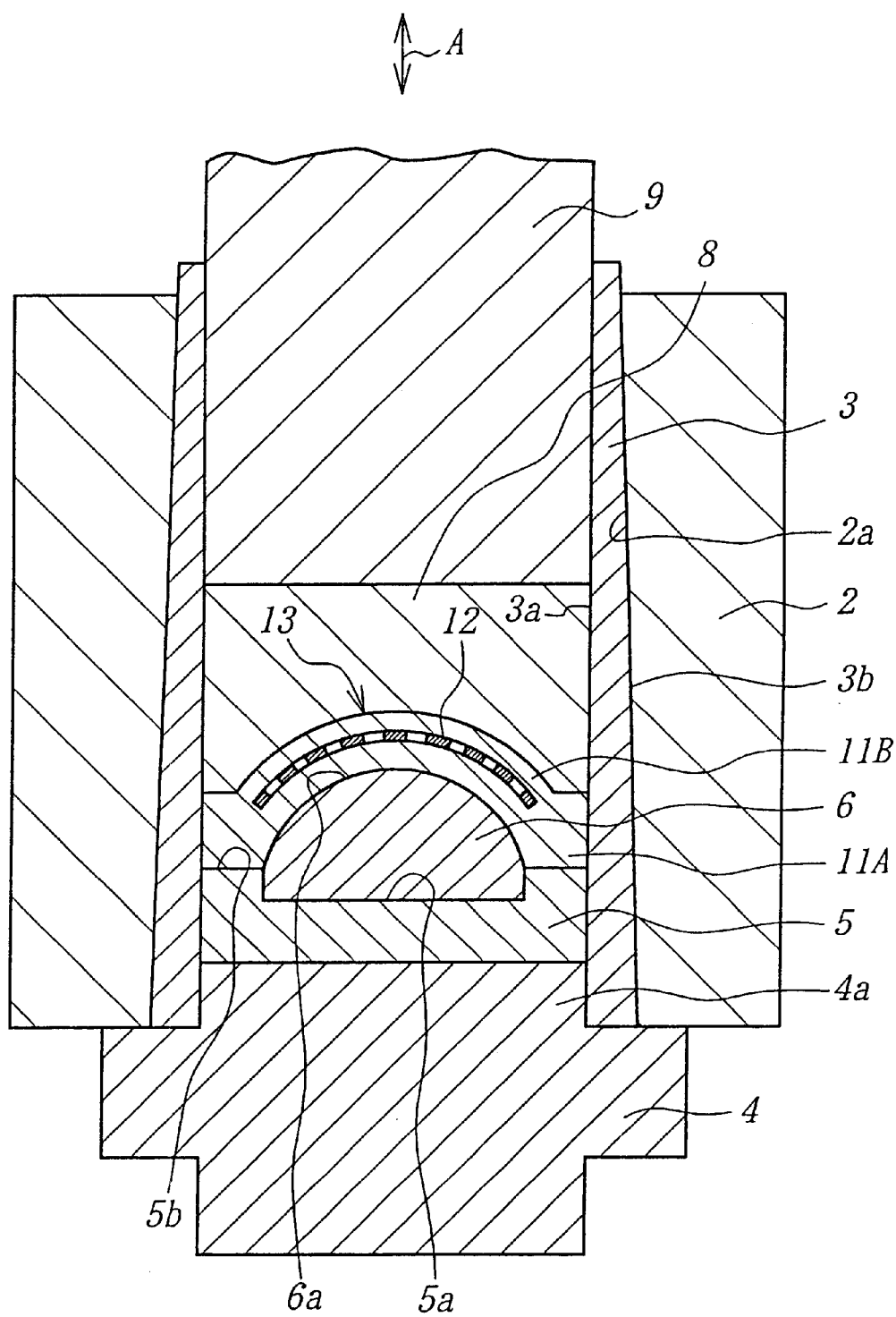
FIG. 4 is a schematic cross sectional view showing a state in which a formed body is formed before performing a hot press sintering.

In the embodiment shown in FIG. 3, an electrode 12 is arranged on the first formed body 11A, additional ceramic powders 10B are supplied thereon, and the upper forming mold 8 and the upper punch 9 are arranged on the ceramic powders 10B. The electrode 12 is preliminarily formed corresponding to the forming surface including the lower surface 8b of the upper forming mold 8 and the surface of the concaved portion 8a of the upper forming mold 8 (i.e. the forming surface of the upper forming mold 8). Under such a condition, a pressure is applied along a direction of the predetermined axis A to obtain a formed body 13 shown in FIG. 4. The formed body 13 comprises the first formed body 11A, a second formed body 11B and the electrode 12 arranged between the first formed body 11A and the second formed body 11B. The first formed body 11A and the second formed body 11B are connected continuously. Under such a condition, a hot press sintering is performed.

A pressure to be applied during the forming is substantially the same as that of the normal axially pressurized forming, but it is preferred that the pressure is 100–200 kg/cm$^2$. Moreover, the pressure to be applied and the temperature during the hot press sintering are substantially the same as those of the normal hot press sintering.

In this manner, it is possible to manufacture the electrode apparatus 15 for plasma generation having the construction shown in FIG. 5. The electrode apparatus 15 comprises a substrate 18 and the electrode 12 embedded therein. The substrate 18 comprises an upper surface layer 18a, a lower surface layer 18b and a flange portion 18c arranged at a peripheral portion of the upper and the lower surface layers. A surface 17 of the upper surface layer 18a is formed corresponding to the surface of the concaved portion 8a of the upper forming mold 8. A concaved portion 16 is formed at an inner portion of the lower surface layer 18b. A thickness of the electrode apparatus 15 along a direction of the predetermined axis A is minimum at a center portion 20 and is maximum at the flange portion 18c. In the present invention, it is necessary that the maximum thickness C is not more than two times larger than the minimum thickness B. In addition, it is preferred to set the maximum thickness C to -1.1–1.8 times larger than the minimum thickness B.

Moreover, in this embodiment, a thickness of the electrode apparatus 15 along a direction of the predetermined axis A continuously varies from a maximum thickness position 21 to the minimum thickness position 20. Here, the phrase "thickness is continuously varied" means such a case that the thickness is not varied intermittently, and thus it is possible to partly include a portion at which the thickness is not varied.

Experiment 1

The electrode apparatus 15 shown in FIG. 5 was manufactured according to the method explained in FIGS. 1–4. In this case, aluminum nitride powders of 0.3 kg were measured and supplied into the space 7 shown in FIG. 1. The aluminum nitride powders were then smoothed by a predetermined flatter machine, and the upper forming mold 8 and the upper punch 9 were set as shown in FIG. 2. A pressure of 200 kg/cm$^2$ was applied thereto for 1 minute to perform a pressing. After the pressing, the upper punch 9 and the upper forming mold 8 were pulled up, and the first formed body 11A having a disc shape diameter of 100 mm and a height of 50 mm was obtained.

Next, electrode 12 having a diameter of 80 mm was arranged on the first formed body 11A. The electrode 12 was made of a molybdenum mesh which was preliminarily press-formed. Additional aluminum nitride powders of 0.07 kg were then measured and supplied on the electrode 12. The additional aluminum nitride powders were smoothed by a predetermined flatter machine, and the upper forming mold 8 and the upper punch 9 were set as shown in FIG. 3. Also, the overall surface of the aluminum nitride powders was completely covered by a flexible graphite sheet not shown. Then, a pressure of 200 kg/cm$^2$ was applied thereto for 1 minute so as to perform a pressing.

A hot press sintering was performed to obtain the formed body 13. In this case, a temperature was increased to a maximum temperature of 1800° C. under a nitrogen atmosphere of 1.5 atm and was maintained at 1800° C. for two hours under a pressure of 2000 kg/cm$^2$ so as to obtain the electrode apparatus 15 shown in FIG. 5. The diameter of the electrode apparatus 15 was 100 mm, the thickness at position 20 was 10 mm, the thickness at position 21 was 20 mm, and the inner diameter of the flange portion 18c was 80 mm.

Then, specimens were cut out from regions 23A, 23B and 23C shown in FIG. 5. With respect to the specimens thus prepared, a four point flexural strength test was performed, and the densities of the specimens were measured using the Archimedes method. As a result, the specimens cut out from the regions 23A, 23B and 23C indicated a density of 3.26 g/cc (the number of specimens used for this calculation was three respectively). The flexural strength of the specimen cut out from the region 23A was 380±30 MPa (the number of specimens used for this calculation was five). The flexural strength of the specimen cut out from the region 23B was 39±40 MPa (the number of the specimens used for this calculation was five). The flexural strength of the specimen cut out from the region 23C was 380±30 MPa (the number of the specimens used for this calculation was five). In this manner, and while a thickness ratio was not more than two, a ceramic sintered body having even density and flexural strength at respective regions could be obtained.

Experiment 2

The electrode apparatus 15 was manufactured in the same manner as that of experiment 1. In experiment 2, a diameter of the electrode apparatus 15 was 100 mm, a thickness at position 20 was 10 mm, a thickness at position 21 was 30 mm, and an inner diameter of the flange portion 18c was 80 mm.

As a result, a density of the specimen cut out from the region 23A was 3.21 g/cc, a density of the specimen cut out from the region 23B was 3.26 g/cc, and a density of the specimen cut out from the region 23C was 3.19 g/cc (the number of specimens used for this calculation was three respectively). Moreover, the flexural strength of the specimen cut out from the region 23A was 210±30 MPa (the number of specimens used for this calculation was five). The flexural strength of the specimen cut out from the region 23B was 390±40 MPa (the number of specimens used for this calculation was five). The flexural strength of the specimen cut out from the region 23C was 200±30 MPa (the number of specimens used for this calculation was five). Further, upon observing a specimen cross section, it was confirmed that the portion at which the thickness was more than twice the minimum thickness indicated a change in color, which showed a low density and a low flexural strength. In this manner, if the thickness was more than twice the minimum thickness, a larger density difference at respective portions of the ceramic sintered body was detected, and also a decrease of flexural strength was detected partly.

As mentioned above, according to the invention, it is possible to manufacture the ceramic sintered body having a different thickness along a predetermined axial direction by means of hot press sintering and it is possible to prevent variations of a density and a flexural strength during the hot press sintering.

What is claimed is:

1. A method of manufacturing a ceramic sintered body having a different thickness along a predetermined axial direction, comprising the steps of:

providing a ceramic formed body having a dome shape including a projected upper surface and a concaved lower surface, and having a varying thickness along the predetermined axial direction;

accommodating the ceramic formed body in a hot press apparatus;

setting an upper forming mold and a lower forming mold each having a forming surface corresponding to an upper surface and a lower surface of the ceramic formed body;

applying a pressure along the predetermined axial direction of the ceramic formed body via the upper forming mold and the lower forming mold while heating the ceramic formed body to perform a hot press sintering thereof to thus form a ceramic sintered body; and controlling a thickness of the ceramic sintered body in such a manner that a maximum thickness in the predetermined direction is not more than two times a minimum thickness in the predetermined direction.

2. The method of manufacturing a ceramic sintered body according to claim 1, wherein a thickness of the ceramic sintered body is continuously varied from the maximum thickness to the minimum thickness.

3. The method of manufacturing a ceramic sintered body according to claim 1, wherein the hot press sintering is performed after a metal member is embedded in the ceramic formed body to be sintered.

4. A method of manufacturing ceramic sintered bodies having a different thickness along a predetermined axial direction, comprising the steps of:

providing a ceramic formed body having a dome shape including a projected upper surface and a concaved lower surface, and having a varying thickness along the predetermined axial direction;

accommodating the ceramic formed body in a hot press apparatus;

setting an upper forming mold and a lower forming mold each having a forming surface corresponding to an upper surface and a lower surface of the ceramic formed body;

applying a pressure along the predetermined axial direction of the ceramic formed body via the upper forming mold and the lower forming mold while heating the ceramic formed body to perform a hot press sintering thereof to thus form a ceramic sintered body; and controlling a thickness of the ceramic sintered body in such a manner that a maximum thickness in the predetermined direction is not more than two times a minimum thickness in the predetermined direction, wherein a metal member is preliminarily formed corresponding to the forming surface of the upper forming mold or the lower forming mold, then the thus formed metal member is embedded in the ceramic formed body to be sintered, and then the hot press sintering is performed.

5. The method of manufacturing a ceramic sintered body according to claim 1, wherein the ceramic sintered body is symmetric with respect to said predetermined axial direction.

6. The method of manufacturing a ceramic sintered body according to claim 1, wherein the ceramic sintered body comprises aluminum nitide.

* * * * *